UNITED STATES PATENT OFFICE.

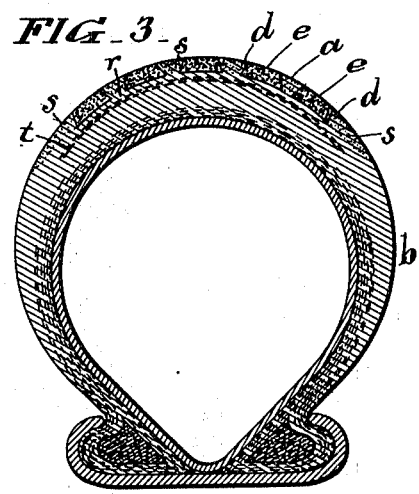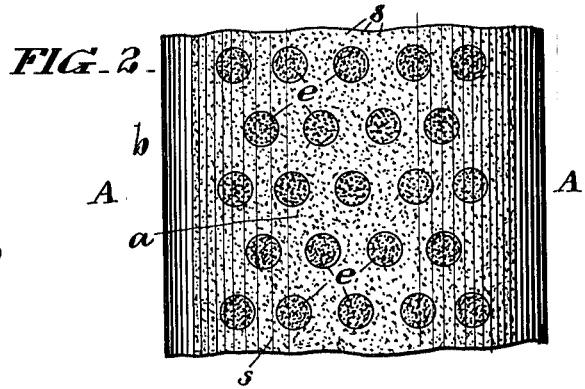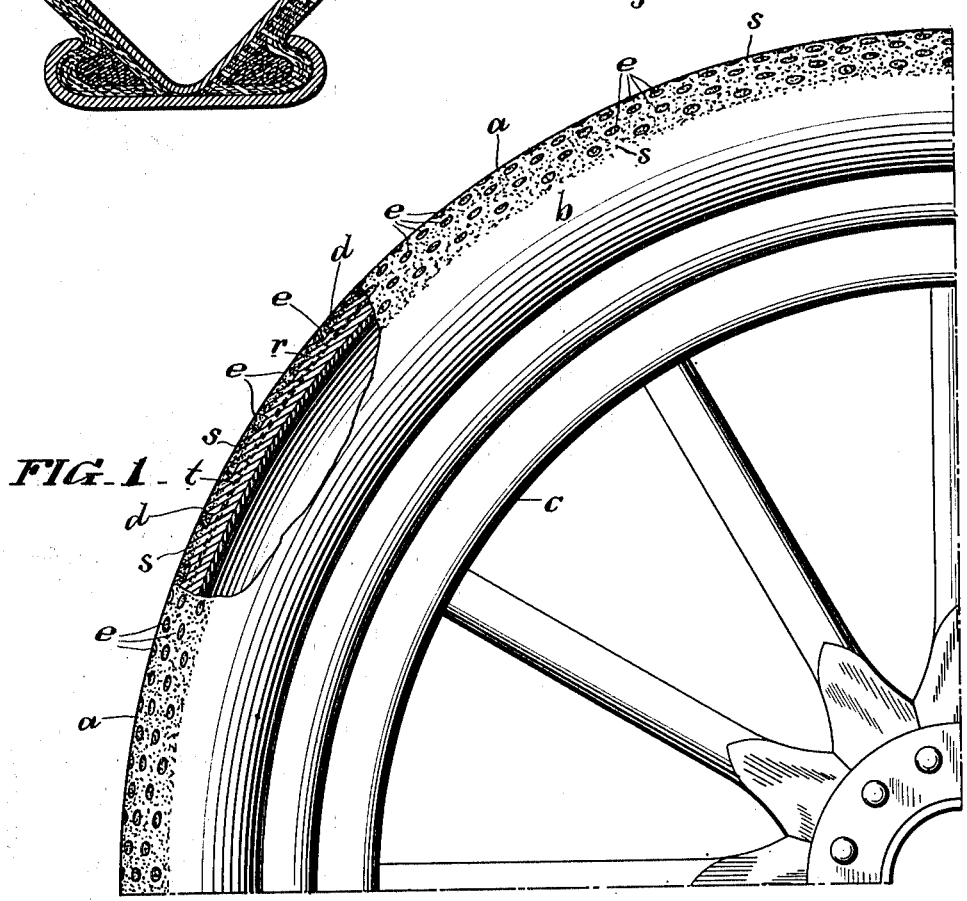

JULIUS STROMEYER, OF PHILADELPHIA, PENNSYLVANIA.

VEHICLE-TIRE.

1,088,845.  Specification of Letters Patent.  Patented Mar. 3, 1914.

Application filed June 7, 1913. Serial No. 772,220.

*To all whom it may concern:*

Be it known that I, JULIUS STROMEYER, citizen of the United States, and resident of Philadelphia, county of Philadelphia, and State of Pennsylvania, have invented an Improvement in Vehicle-Tires, of which the following is a specification.

It is the object of my invention to provide a construction of tire which will reduce the tendency of slippage on starting the vehicle or when suddenly changing the speed, and which, moreover, will prevent to a very large degree the skidding which is so prevalent with tires as ordinarily constructed. This result I accomplish by combining with the tread-portion of the tire a quantity of pulverulent, known as magnesite, in such manner as to present a friction surface over the active tread. The pulverulent is applied in the form of a fine gritty composition incorporated with the rubber of the tread. The pulverulent magnesite thus incorporated into the tread structure is made effective at the surface of the tread to produce the friction over the tread-surface when the tire is in use and to prevent undue heating.

The use of rubber tires in automobiles has introduced a source of danger by reason of the fact that the tires have but little frictional hold upon the ground where it is hard and smooth, and hence cause the vehicle to skid on turning corners sharply at speed or upon straight roads where, for instance, the wheels run upon ice or soft places irregularly disposed. By providing a tread surface having decided friction producing qualities, irrespective of the surface the wheel is traveling over, I am enabled to prevent irregular and unequal driving action of the rear wheels and lateral slippage or skidding of the front wheels, with the result that the vehicle may be driven at any reasonable speed on straight or curved roads of any character without danger.

In carrying out my invention, I employ magnesite (mineral carbonate of magnesia), preferably associated as a compound, as the gritty material because of its friction producing qualities without injury to the rubber with which it is intimately incorporated. When incorporated into the rubber of the tread, it may be mixed with the rubber before being vulcanized, and in this manner become distributed, not only upon the surface but also in the mass of the tread so that, even as the tread wears down, fresh particles of the magnesite will be exposed at the surface and insure a continuance of the friction producing characteristics, notwithstanding the natural and normal wear which necessarily takes place. In use of the tire, the magnesite, under friction on the roads, provides a powder which, as a fine dust, acts as a positive frictional coating to the outer surface of the tread portion of the tire to assist the direct action of the magnesite incorporated with the rubber mass.

My invention is more fully described hereinafter in respect to the tire structure, and will be better understood by reference to the drawings, in which:—

Figure 1 is a side elevation of a portion of a vehicle-wheel provided with a tire embodying the invention, part of the tire being shown in longitudinal section; Fig. 2 is a front elevation of the tire; and Fig. 3 is a transverse section of the same.

Except in the tread-portion $a$ the tire $b$ is of any ordinary construction and may be attached to the wheel $c$ in any convenient manner. The tire as a whole may be pneumatic or otherwise.

Disposed through the tread-portion $a$ and at the surface is a quantity of pulverulent material $s$ adapted to form over the outer surface a thin film or coating, which comes in contact with the road during the travel of the tire. This pulverulent may be distributed through or upon the surface of the tread-portion in any convenient manner. I prefer, however, to incorporate the pulverulent material in grains with the rubber of the tread. In practice, the incorporation of the pulverulent in the tread should preferably be outside of the breaker strip $t$ and most desirably, in such manner, as to leave a layer $r$ of pure rubber between the breaker strip and tread proper. As the tire rotates, the frictional contact with the road causes the magnesite to gradually extend over the entire contact surface of the tread-portion in a thin layer or film which adheres to and forms a more or less permanent coating upon the tread-portion. The action of this layer or film and the exposed particles of the magnesite incorporated in the rubber is primarily to prevent slippage or lateral movement of the tire with reference to the surface of the road, so that the possibility of skidding is reduced to a minimum.

In my tire, the entire available surface of the tread-portion is always in action and continues in action during wear, and the frictional resistance to lateral movement or slippage is greatly increased.

By the employment of magnesite, as before stated, I not only produce the desired friction, but also provide a material which rapidly radiates the heat produced by the friction of the tire upon the ground, and consequently prevents the injury of the rubber portion of the tire from overheating. The magnesite has a high coefficient of conductivity for heat and because of this the heating of the rubber tread is prevented to an objectionable degree, and moreover the magnesite particles provide a multitude of heat radiating points which act to quickly dissipate the objectionable heat produced at high speeds; and moreover the magnesite is not affected objectionably by moisture.

Where desired, the tire tread portion may, in addition to the incorporation of the pulverized magnesite with the rubber as hereinbefore described, be further provided with small pockets $d$ at intervals and these filled with blocks $e$ of magnesite compound such as a hard mixture made from powdered magnesite, fine sand and a binder such as chlorid of magnesia. The compound may be placed in the pockets $d$ in a plastic condition and allowed to set and harden therein.

The invention is not limited to any particular proportion of pulverulent with reference to the tread-portion, provided it be sufficient to produce the desired effect.

I have described my invention in the form I believe most desirable, but I do not restrict myself to the minor details, as these may be varied within the scope of the claim, without being a departure from the invention.

Not only is the pulverulent effective in preventing slippage and skidding, and the heating of the tire, but it also acts to strengthen the tread-portion, decreasing the wear and increasing the durability of the tire.

What I claim is as follows:

A vehicle-tire having a rubber tread formed with magnesite material in a finely sub-divided condition intimately incorporated with rubber in vulcanized condition, said mixture extending from the surface inwardly to provide a frictional tread surface, the composition of which is maintained during the normal wear of the tread.

In testimony of which invention, I hereunto set my hand.

JULIUS STROMEYER.

Witnesses:
 WATSON B. RULON,
 R. M. HUNTER.